United States Patent Office 2,738,859
Patented Mar. 20, 1956

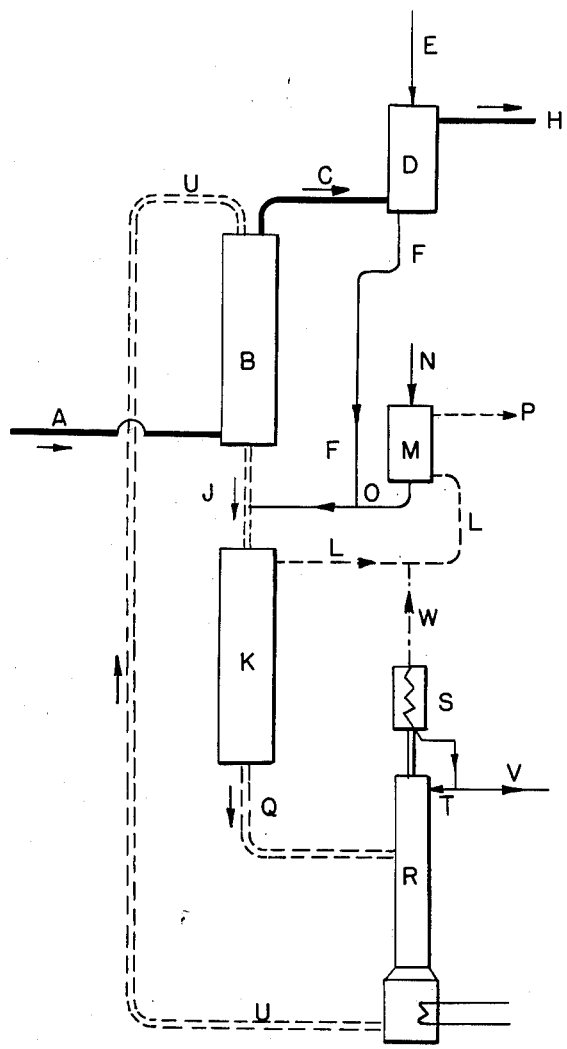

2,738,859

SEPARATION OF ACETYLENE FROM GASEOUS MIXTURES

Ernst Bartholomé, Ludwigshafen (Rhine), Erwin Lehrer, Bad Durkheim, and Lothar Lorenz, Ludwigshafen (Rhine), Germany, assignors to Badische Anilin- & Soda-Fabrik Aktiengesellschaft, Ludwigshafen (Rhine), Germany Application September 13, 1951, Serial No. 246,482

Claims priority, application Germany October 14, 1950

4 Claims. (Cl. 183—115)

This invention relates to a method of separating acetylene from gaseous mixtures containing same, and more particularly to the production of acetylene of high purity from strongly diluted acetylene as obtained in high-temperature decomposition or partial combustion of natural gas and similar low molecular paraffin hydrocarbons.

It is well known that diluted acetylene may be concentrated by treating it with a solvent of selective absorption power for acetylene, and releasing the acetylene in a more concentrated or even pure state by heating the solvent or applying reduced pressure to it or by simultaneous application of these two methods. These methods, however, have the drawback that it is difficult to strip the solvent completely of the acetylene. When, in order to achieve this, the pressure is reduced too strongly, say to below of 0.1 atmosphere, it requires too much energy to compress the released acetylene. On the other hand, heating of the charged solvent e. g. to temperatures exceeding 100° C. is expensive and may decompose the solvent and the dissolved gas.

It is an object of our invention to make the separation of acetylene from gaseous mixtures with the aid of organic solvents simple and more economic. Another object of our invention is to provide a continuous process for separating acetylene from gases obtained by high-temperature decomposition or partial combustion of natural gas by using organic solvents for absorption and complete recovery of the concentrated acetylene from the solvent and recirculation thereof. Other objects and advantages of our invention will be more fully understood by the following description and the accompanying drawing.

Our invention consists in using for the treatment of the gaseous mixture containing acetylene a mixture of water with an excess of an organic solvent which has dissolving power for acetylene, is miscible at least partly with water and has a higher boiling point than water. When using such a mixture for absorbing acetylene from a gas mixture it is relatively easy and inexpensive to strip the solution completely of the dissolved acetylene by applying moderately reduced pressure, e. g. from 0.15 to 0.5 atmospheres, and vaporizing at that pressure at least part of the water while allowing the liquid to flow down a column. The acetylene thus will be expelled from the liquid by the vapors raising in counter-current to the liquid. Before subjecting the solvent to the vaporization of water a substantial amount of the acetylene is preferably desorbed simply by vacuum.

Another advantage of our invention resides in the possibility to avoid losses of the organic solvent. Both of the gases obtained in our process, viz. the concentrated acetylene and the gas stripped of acetylene, so-called "tail gas," are likely to take traces of the solvent with them in the form of vapor. By washing one or both of these gases with a small amount of water, these traces of solvent are removed and may be rendered useful by admixing it with the bulk of the organic solvent to be used in the absorption stage of our process, thereby maintaining the water-content thereof on the desired level.

Referring to the drawing, the gaseous mixture containing acetylene, either under normal pressure or under a few atmospheres, say between 2 and 10, enters through pipe A into the absorber B, preferably an absorbing tower containing distributing devices. The gas comes into countercurrent with the solvent entering through pipe U at the top of B. The gas freed from acetylene leaves through pipe C and may be led into a washing tower D where it is stripped of solvent vapors by water running in countercurrent from pipe E to pipe F. The tail gas then leaves the apparatus through pipe H.

The solvent loaded with acetylene flows through pipe J into the desorber or stripper K. Instead of using one of these desorbers we may as well install a battery of them, the solvent leaving at the bottom of each and entering at the top of the next one. In these desorbers, the solvent is heated moderately, preferably to from 50° C. to 80° C., depending on the composition of the solvent and the pressure. The temperature is such that no substantial amount of water distills off. As pointed out above, we prefer to reduce the pressure to from about 0.15 to 0.5 atmosphere. Most of the acetylene is thereby expelled; it leaves the stripper through pipe L and is washed in a washing unit M with water running from pipe N and to pipe O.

The acetylene freed from solvent waters leaves the apparatus through pipe P.

The water coming from washing unit D through pipe F is combined with the water coming from washing unit M through pipe O, and the total is added to the solvent in line J.

From the stripper K the solvent runs through pipe Q into column R where it is subjected to a vacuum distillation, distilling off so much water that the composition of the solvent becomes the same as it entered the absorber B. It is then led back through a cooler (not shown) via pipe U to the absorber B. All acetylene still contained in the solvent when leaving K is expelled in column R. It leaves at the top thereof, passes the cooler S and is admixed by way of pipe W to the acetylene stream coming from the absorber through line L. In the cooler S the water vapors are condensed; the water is led back partly through pipe T into column R, partly removed through pipe V.

The particular solvent used for carrying out our invention is not essential, provided it is capable of dissolving acetylene, miscible at least partly with water and boiling above water. We prefer to use oxygen-containing solvents, for example aliphatic ketones, boiling above 100° C., acetals of aldehydes, aliphatic ethers containing a hydrophilic group, e. g. a hydroxy group in addition to the ether oxygen atom, such as glycolmonoethers, carboxylic acid esters containing further hydrophilic groups either in the acid or in the alcohol radicle, e. g. lactic acid esters or glycol monoesters of lower carboxylic acids. We have found that lactones or lactames are especially suitable solvents, e. g. butyrolactone or butyrolactame substituted in the nitrogen atom by a saturated lower aliphatic hydrocarbon radicle, such as methyl or propyl.

Example

In the manner described above in connection with the drawing 110 cubic meters (NPT) of a gas consisting of 8.3 per cent of acetylene, 3.4 per cent of $CO_2$, 0.5 per cent of higher acetylene hydrocarbons, 0.2 per cent of $C_2H_4$, 0.4 per cent of $O_2$, 24.6 per cent of CO, 56.2 per cent of $H_2$ and 6.4 per cent of $CH_4$ per hour are brought into contact with 1.35 cubic meters of a mixture of 97 per cent of γ-butyrolactone and 3 per cent of water at 25° C. and under 6 to 8 atmospheres. The tail gas leaving the absorber (B) at C contains less than 0.1 per cent of acetylene. It is washed with 1 kilogram/hour of water. In the stripper a temperature of 70° C. is maintained and the pressure reduced to 0.2 atmosphere. In the column R the same pressure is maintained, but the temperature raised to 90° C.

The exact composition of the acetylene thus obtained is as follows: 93.2 per cent $C_2H_2$; 5.7 per cent higher acetylene hydrocarbons; 0.1 per cent $CO_2$.

The tail gas has the following composition: 0.1 per cent $C_2H_2$; 3.6 per cent $CO_2$; 0.2 per cent $C_2H_4$; 0.4 per cent $O_2$; 27.0 per cent CO; 61.7 per cent $H_2$; 7.0 per cent $CH_4$.

While we have demonstrated above working with a solvent containing 3 per cent of water, we could also use a solvent with 5, 8 or 12 per cent of water. Generally speaking, we prefer to work with from 2 to 10 per cent thereof, since with increasing the water content too much the solubility of acetylene becomes less and it is necessary to increase the circulation or the amount of the solvent.

What we claim is:

1. A method for the recovery of acetylene from gases containing the same which comprises contacting the gases in an extracting zone with a solution of water in an excess of a liquid organic solvent having dissolving power for acetylene, being at least partially miscible with water and having a higher boiling point than water, washing the gas free from acetylene with water to absorb vaporous organic solvent, releasing the bulk of the acetylene from the bulk of the solvent containing the acetylene in a stripping zone by decreasing the pressure at a temperature where no substantial amount of water distills off, washing the acetylene released with water to absorb vaporous organic solvent, subjecting the solvent stripped from the bulk of the acetylene in a rectifying zone under reduced pressure to a rectification, adding the water loaded with solvent from the two washing operations to the solvent stream between the extracting zone and the rectifying zone, and removing the balance of the acetylene from the solvent and also removing water free from solvent in an amount which corresponds to that used for washing the gas freed from acetylene and that used for washing the acetylene released in the stripping zone, and recycling the solvent freed from acetylene and from this amount of water to the extracting zone.

2. A method as set forth in claim 1 wherein a pressure of between 2 and 10 atmospheres is applied in the extracting zone, and a pressure of between 0.15 to 0.5 atmosphere is applied in the stripping and rectifying zones.

3. A method as set forth in claim 1 wherein γ-butyrolactone is used as the organic solvent, a pressure of between 2 and 10 atmospheres is applied in the extracting zone, and a pressure of between 0.15 and 0.5 atmosphere is applied in the stripping and rectifying zones.

4. A method for the recovery of acetylene from gases containing the same which comprises contacting the gases at a pressure of between 2 and 10 atmospheres in an extracting zone with a solution of from 2 to 10 per cent of water in a liquid organic solvent having dissolving power for acetylene, being at least partially miscible with water and having a higher boiling point than water, washing the gas freed from acetylene with water to absorb vaporous organic solvent, adding the water thus loaded with solvent to the bulk of the solvent containing the acetylene while removing it from the extracting zone, releasing the bulk of the acetylene from the latter in a stripping zone under a pressure of between 0.15 and 0.5 atmosphere and at a temperature where no substantial amount of water distills off, washing the acetylene released with water to absorb vaporous organic solvent, adding the water thus loaded with solvent to the bulk of the solvent, subjecting the solvent stripped from the bulk of the acetylene in a rectifying zone under a reduced pressure between 0.15 and 0.5 atmosphere to a rectification and removing the balance of the acetylene therefrom and also removing water free from solvent in an amount which corresponds to that used for washing the gas freed from acetylene and that used for washing the acetylene released in the stripping zone, adding the acetylene released in the rectifying zone to the bulk of the acetylene released in the stripping zone, and recycling the solvent free from acetylene and from the said amount of water from the rectifying zone to the extracting zone.

References Cited in the file of this patent

UNITED STATES PATENTS

| | | |
|---|---|---|
| 1,875,311 | Voorhees et al. | Apr. 30, 1932 |
| 2,026,265 | Bennett | Dec. 31, 1935 |
| 2,063,680 | Isham | Dec. 8, 1936 |
| 2,236,964 | Babcock | Apr. 1, 1941 |
| 2,366,360 | Semon | Jan. 2, 1945 |
| 2,371,908 | Morris | Mar. 20, 1945 |
| 2,385,705 | Huffman | Sept. 25, 1945 |
| 2,386,523 | Welling | Oct. 9, 1945 |
| 2,434,796 | Hachmuth | Jan. 20, 1948 |
| 2,667,234 | Hasche | Jan. 26, 1954 |

OTHER REFERENCES

Hasche: Abstract of application Serial No. 633,843, published Feb. 7, 1950, 631 O. G. 28.